US009319172B2

(12) United States Patent
Jalali et al.

(10) Patent No.: US 9,319,172 B2
(45) Date of Patent: Apr. 19, 2016

(54) INTERFERENCE MITIGATION TECHNIQUES FOR AIR TO GROUND SYSTEMS

(75) Inventors: Ahmad Jalali, San Diego, CA (US); Bin Tian, San Diego, CA (US); Leonard N. Schiff, San Diego, CA (US); William G. Ames, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/550,071

(22) Filed: Jul. 16, 2012

(65) Prior Publication Data

US 2013/0182790 A1 Jul. 18, 2013

Related U.S. Application Data

(60) Provisional application No. 61/547,646, filed on Oct. 14, 2011.

(51) Int. Cl.

*H04W 4/00* (2009.01)
*H04L 1/00* (2006.01)
*H04W 16/14* (2009.01)

(Continued)

(52) U.S. Cl.

CPC .............. *H04L 1/0001* (2013.01); *H01Q 1/282* (2013.01); *H01Q 3/24* (2013.01); *H01Q 13/02* (2013.01); *H01Q 21/064* (2013.01); *H01Q 25/00* (2013.01); *H04B 7/0617* (2013.01); *H04B 7/18506* (2013.01); *H04L 1/0002* (2013.01); *H04L 1/0009* (2013.01); *H04L 1/0071* (2013.01); *H04W 16/14* (2013.01); *H01Q 3/26* (2013.01);

(Continued)

(58) Field of Classification Search

USPC ................................................ 375/285, 259

See application file for complete search history.

(56) References Cited

U.S. PATENT DOCUMENTS 3,946,395 A 3/1976 Kirchhoff
5,123,112 A 6/1992 Choate (Continued)

FOREIGN PATENT DOCUMENTS

CN 101536360 A 9/2009
DE 102009019995 A1 11/2010

(Continued)

OTHER PUBLICATIONS

International Search Report and Written Opinion—PCT/US2012/060077—ISA/EPO—Feb. 28, 2013.

(Continued)

*Primary Examiner* — Leon-Viet Nguyen
(74) *Attorney, Agent, or Firm* — Liberty E. Mann

(57) ABSTRACT

A method for air to ground communication interference mitigation within an aircraft equipped with a multi-beam array antenna includes adjusting a modulation symbol interleaving and/or forward error correction of an aircraft receiver interface in response to detected interference from an interferer. The method further includes reducing a data rate of the aircraft receiver interface when the adjusting of the modulation symbol interleaving and/or forward error correction does not mitigate the detected interference. Another method for interference mitigation may include performing antenna beam-steering away from a geographic (GEO) arc during an aircraft turn. This method further includes reducing an aircraft transmitter transmit power when a signal quality of a forward link is within a predetermined range of a signal quality threshold.

12 Claims, 11 Drawing Sheets

(51) Int. Cl.

| | |
|---|---|
| ***H01Q 3/24*** | (2006.01) |
| ***H04B 7/185*** | (2006.01) |
| ***H04B 7/06*** | (2006.01) |
| ***H01Q 1/28*** | (2006.01) |
| ***H01Q 13/02*** | (2006.01) |
| ***H01Q 21/06*** | (2006.01) |
| ***H01Q 25/00*** | (2006.01) |
| *H01Q 3/26* | (2006.01) |
| *H04W 52/24* | (2009.01) |

(52) U.S. Cl.
CPC .............. *H04L 1/0034* (2013.01); *H04W 52/24* (2013.01); *Y02B 60/31* (2013.01)

(56) References Cited

U.S. PATENT DOCUMENTS

| | | | | |
|---|---|---|---|---|
| 5,444,762 | A | 8/1995 | Frey et al. | |
| 6,104,926 | A | 8/2000 | Hogg et al. | |
| 6,311,075 | B1 | 10/2001 | Bevan et al. | |
| 6,426,720 | B1 | 7/2002 | Ross et al. | |
| 6,642,894 | B1 | 11/2003 | Gross et al. | |
| 6,791,507 | B2 | 9/2004 | Johansson et al. | |
| 6,963,742 | B2 | 11/2005 | Boros et al. | |
| 7,084,811 | B1 | 8/2006 | Yap | |
| 7,187,950 | B2 | 3/2007 | Hintermeier et al. | |
| 7,193,574 | B2 | 3/2007 | Chiang et al. | |
| 7,304,605 | B2 | 12/2007 | Wells | |
| 7,310,380 | B1 * | 12/2007 | Young et al. | 375/295 |
| 7,392,015 | B1 | 6/2008 | Farlow et al. | |
| 7,414,578 | B1 | 8/2008 | Courtade et al. | |
| 7,567,213 | B2 | 7/2009 | Liu | |
| 7,684,802 | B2 | 3/2010 | Jalali | |
| 7,751,814 | B2 | 7/2010 | Cruz et al. | |
| 8,639,265 | B1 | 1/2014 | Gauba et al. | |
| 2002/0071406 | A1 | 6/2002 | Bursztejn et al. | |
| 2002/0101913 | A1 | 8/2002 | Masters et al. | |
| 2003/0069043 | A1 | 4/2003 | Chhaochharia et al. | |
| 2003/0128671 | A1 | 7/2003 | Niesen | |
| 2003/0198201 | A1 | 10/2003 | Ylitalo et al. | |
| 2004/0127260 | A1 | 7/2004 | Boros et al. | |
| 2004/0158863 | A1 * | 8/2004 | McLain | 725/73 |
| 2005/0030248 | A1 | 2/2005 | Gabriel et al. | |
| 2005/0187677 | A1 * | 8/2005 | Walker | 701/16 |
| 2005/0213527 | A1 | 9/2005 | Xie | |
| 2006/0009162 | A1 | 1/2006 | Tan et al. | |
| 2006/0030311 | A1 * | 2/2006 | Cruz et al. | 455/431 |
| 2006/0040614 | A1 | 2/2006 | Chapelle et al. | |
| 2006/0229076 | A1 | 10/2006 | Monk | |
| 2006/0229077 | A1 | 10/2006 | Monk | |
| 2006/0229103 | A1 | 10/2006 | Monk | |
| 2007/0183545 | A1 | 8/2007 | Yuda et al. | |
| 2008/0102812 | A1 | 5/2008 | Chari et al. | |
| 2008/0174488 | A1 | 7/2008 | Weinstein et al. | |
| 2008/0240029 | A1 | 10/2008 | Lynch et al. | |
| 2008/0240038 | A1 | 10/2008 | Lynch et al. | |
| 2008/0266166 | A1 * | 10/2008 | Schuchman | 342/37 |
| 2009/0185533 | A1 | 7/2009 | Kim et al. | |
| 2009/0186611 | A1 | 7/2009 | Stiles et al. | |
| 2009/0233545 | A1 | 9/2009 | Sutskover et al. | |
| 2010/0098030 | A1 | 4/2010 | Wang et al. | |
| 2010/0117890 | A1 | 5/2010 | Vook et al. | |
| 2010/0189089 | A1 | 7/2010 | Lynch et al. | |
| 2011/0034190 | A1 * | 2/2011 | Leabman | 455/500 |
| 2011/0134889 | A1 | 6/2011 | Harvey et al. | |
| 2011/0263199 | A1 | 10/2011 | Cruz et al. | |
| 2011/0265128 | A1 * | 10/2011 | Bengeult et al. | 725/64 |
| 2012/0200458 | A1 | 8/2012 | Jalali et al. | |
| 2012/0202418 | A1 | 8/2012 | Jalali et al. | |
| 2012/0202430 | A1 | 8/2012 | Jalali et al. | |
| 2014/0150034 | A1 * | 5/2014 | Frisco et al. | 725/68 |
| 2014/0200045 | A1 | 7/2014 | Jalali et al. | |

FOREIGN PATENT DOCUMENTS

| | | | |
|---|---|---|---|
| EP | 0807989 | A1 | 11/1997 |
| EP | 1143751 | A1 | 10/2001 |
| EP | 1271694 | A2 | 1/2003 |
| EP | 2161855 | A1 | 3/2010 |
| EP | 2200190 | A2 | 6/2010 |
| JP | H10117162 | A | 5/1998 |
| JP | H11205222 | A | 7/1999 |
| JP | 2003078328 | A | 3/2003 |
| JP | 2006505155 | A | 2/2006 |
| JP | 2006081158 | A | 3/2006 |
| JP | 2010508773 | A | 3/2010 |
| JP | 2011019067 | A | 1/2011 |
| JP | 2012502527 | A | 1/2012 |
| WO | 9943048 | A1 | 8/1999 |
| WO | 9945609 | A1 | 9/1999 |
| WO | 03103247 | A1 | 12/2003 |
| WO | 2005060142 | A1 | 6/2005 |
| WO | 2006060197 | A1 | 6/2006 |
| WO | 2006123227 | A2 | 11/2006 |
| WO | 2006124063 | A2 | 11/2006 |
| WO | 2008054936 | A2 | 5/2008 |
| WO | WO-2010025997 | A1 | 3/2010 |
| WO | WO-2010055749 | A1 | 5/2010 |
| WO | 2010060953 | A1 | 6/2010 |
| WO | 2010092082 | A1 | 8/2010 |

OTHER PUBLICATIONS

Pace et al., "Wireless communication networks via aerial platforms: Dynamic fair power sharing admission control for UMTS real time traffic sources", IEEE International Conference on Telecommunications and Malaysia International Conference on Communications (ICT-MICC), May 14, 2007, pp. 616-621, IEEE, XP031228661, ISBN: 978-1-4244-1093-4.

Pearce et al., "Optimum antenna configurations for millimetre-wave communications from high-altitude platforms", IET Communications, Jun. 1, 2007, pp. 359-364, vol. 1, No. 3, XP006028858.

Yu Chiann Foo et al., "Centralized downlink call admission control for high altitude platform station UMTS with onboard power resource sharing", Proceedings of IEEE 56th Vehicular Technology Conference, Sep. 24, 2002, pp. 549-553, vol. 1, IEEE, XP010608617, ISBN: 978-0-7803-7467-6.

* cited by examiner

INTERFERENCE MITIGATION TECHNIQUES FOR AIR TO GROUND SYSTEMS

CROSS-REFERENCE TO RELATED APPLICATION

The present application for patent claims the benefit of U.S. Provisional Application No. 61/547,646 filed Oct. 14, 2011, in the names of A. Jalali et al., the disclosure of which is expressly incorporated by reference herein in its entirety.

This application is related to commonly assigned U.S. patent application Ser. No. 13/168,538, entitled "HIGH DATA RATE AIRCRAFT TO GROUND COMMUNICATION ANTENNA SYSTEM," in the names of A. JALALI et al., filed on Jun. 24, 2011, now U.S. Pat. No. 8,676,192, commonly assigned U.S. patent application Ser. No. 13/168,617, entitled "REAL-TIME CALIBRATION OF AN AIR TO GROUND COMMUNICATION SYSTEM," in the names of A. JALALI et al., filed on Jun. 24, 2011, and commonly assigned U.S. patent application Ser. No. 13/168,623, entitled "GROUND STATION ANTENNA ARRAY FOR AIR TO GROUND COMMUNICATION SYSTEM," in the names of A. JALALI et al., filed on Jun. 24, 2011, now abandoned, the disclosures of which are expressly incorporated by reference herein in their entireties.

BACKGROUND

1. Field

Aspects of the present disclosure relate generally to wireless communication systems, and more particularly to providing interference mitigation within an air to ground system that provides Internet services to aircraft.

2. Background

Two main approaches provide Internet access to airplanes. In one approach, an Air to Ground (ATG) system uses terrestrial Ground Base Stations (GBSs) using cellular communication techniques to provide Internet access to aircraft flying over land. A currently used ATG system operating over the continental United States uses only 3 MHz of spectrum. Although, this system may become commercially viable, the limited spectrum may be inadequate to accommodate increasing demand for Internet services, such as streaming of multimedia content to aircraft. In another approach, satellite links provide Internet service to aircraft. In the aeronautical mobile satellite service (AMSS), the satellite based systems have more spectrum available but their cost is excessive.

Because of the excessive cost of satellite links for aircraft Internet communication, it has been preferable to use the terrestrial based ATG systems. It would be desirable to increase available spectrum for ATG and provide techniques that would allow such systems to accommodate the increasing demands for aircraft Internet service without substantially increasing cost.

SUMMARY

According to one aspect of the present disclosure, a method for air to ground communication interference mitigation within an aircraft equipped with a multi-beam array antenna is described. The method includes adjusting a modulation symbol interleaving and/or forward error correction of an aircraft receiver interface in response to detected interference from an interferer. The method further includes reducing a data rate of the aircraft receiver interface when the adjusting of the modulation symbol interleaving and/or forward error correction does not mitigate the detected interference from the interferer.

In another aspect, an apparatus for air to ground communication interference mitigation within an aircraft equipped with a multi-beam array antenna is described. The apparatus includes at least one processor; and a memory coupled to the at least one processor. The processor(s) is configured to adjust a modulation symbol interleaving and/or forward error correction of an aircraft receiver interface in response to detected interference from an interferer. The processor(s) is also configured to reduce a data rate of the aircraft receiver interface when the adjusting of the modulation symbol interleaving and/or forward error correction does not mitigate the detected interference from the interferer.

In a further aspect, a computer program product for air to ground communication interference mitigation within an aircraft equipped with a multi-beam array antenna is described. The computer program product includes a non-transitory computer-readable medium having program code recorded thereon. The computer program product has program code to adjust a modulation symbol interleaving and/or forward error correction of an aircraft receiver interface in response to detected interference from an interferer. The computer program product also includes program code to reduce a data rate of the aircraft receiver interface when the adjusting of the modulation symbol interleaving and/or forward error correction does not mitigate the detected interference from the interferer.

In another aspect, an apparatus for air to ground communication interference mitigation within an aircraft equipped with a multi-beam array antenna is described. The apparatus includes means for adjusting a modulation symbol interleaving and/or forward error correction of an aircraft receiver interface in response to detected interference from an interferer. The apparatus further includes means for reducing a data rate of the aircraft receiver interface when the adjusting of the modulation symbol interleaving and/or forward error correction does not mitigate the detected interference from the interferer.

According to another aspect of the present disclosure, a method for air to ground communication interference mitigation within an aircraft equipped with a multi-beam array antenna is described. The method includes performing antenna beam-steering away from a geographic (GEO) arc during an aircraft turn. The method further includes reducing an aircraft transmitter transmit power when a signal quality of a forward link is within a predetermined range of a signal quality threshold.

In another aspect, an apparatus for air to ground communication interference mitigation within an aircraft equipped with a multi-beam array antenna is described. The apparatus includes at least one processor; and a memory coupled to the at least one processor. The processor(s) is configured to perform antenna beam-steering away from a geographic (GEO) arc during an aircraft turn. The processor(s) is also configured to reduce an aircraft transmitter transmit power when a signal quality of a forward link is within a predetermined range of a signal quality threshold.

In a further aspect, a computer program product for air to ground communication interference mitigation within an aircraft equipped with a multi-beam array antenna is described. The computer program product includes a non-transitory computer-readable medium having program code recorded thereon. The computer program product has program code to perform antenna beam-steering away from a geographic (GEO) arc during an aircraft turn. The computer program product also includes program code to reduce an aircraft transmitter transmit power when a signal quality of a forward link is within a predetermined range of a signal quality threshold.

In another aspect, an apparatus for air to ground communication interference mitigation within an aircraft equipped with a multi-beam array antenna is described. The apparatus includes means for performing antenna beam-steering away from a geographic (GEO) arc during an aircraft turn. The apparatus further includes means for reducing an aircraft transmitter transmit power when a signal quality of a forward link is within a predetermined range of a signal quality threshold.

According to another aspect of the present disclosure, a method for air to ground communication interference mitigation within a ground station equipped with a multi-beam array antenna is described. The method includes assigning an aircraft receiver interface a portion of a communication spectrum that is unused by an interferer when interference is detected from a satellite earth station transmitter. Alternately, the method may include handing-off an aircraft receiver interface to a different ground station when interference is detected from a satellite earth station transmitter. The method may also include performing antenna beam-forming to transmit a NULL toward an interferer when interference is detected from a satellite earth station transmitter.

In another aspect, an apparatus for air to ground communication interference mitigation within a ground station equipped with a multi-beam array antenna is described. The apparatus includes at least one processor; and a memory coupled to the at least one processor. The processor(s) is configured to assign an aircraft receiver interface a portion of a communication spectrum that is unused by an interferer when interference is detected from a satellite earth station transmitter. Alternatively, the processor(s) is configured to hand-off an aircraft receiver interface to a different ground station when interference is detected from a satellite earth station transmitter. The processor(s) may also be configured to perform antenna beam-forming to transmit a NULL toward an interferer when interference is detected from a satellite earth station transmitter.

In a further aspect, a computer program product for air to ground communication interference mitigation within a ground station equipped with a multi-beam array antenna is described. The computer program product includes a non-transitory computer-readable medium having program code recorded thereon. The computer program product has program code to assign an aircraft receiver interface a portion of a communication spectrum that is unused by an interferer when interference is detected from a satellite earth station transmitter. Alternatively, the computer program product may include program code to hand-off an aircraft receiver interface to a different ground station when interference is detected from a satellite earth station transmitter. The computer program product may include program code to perform antenna beam-forming to transmit a NULL toward an interferer when interference is detected from a satellite earth station transmitter.

In another aspect, an apparatus for air to ground communication interference mitigation within a ground station equipped with a multi-beam array antenna is described. The apparatus includes means for operating the ground station in the presence of an interferer. The apparatus includes means for assigning an aircraft receiver interface a portion of a communication spectrum that is unused by the interferer when interference is detected from a satellite earth station transmitter. Alternately, the apparatus may include means for handing-off an aircraft receiver interface to a different ground station when interference is detected from the satellite earth station transmitter. The apparatus may also include means for performing antenna beam-forming to transmit a NULL toward the interferer when interference is detected from a satellite earth station transmitter.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
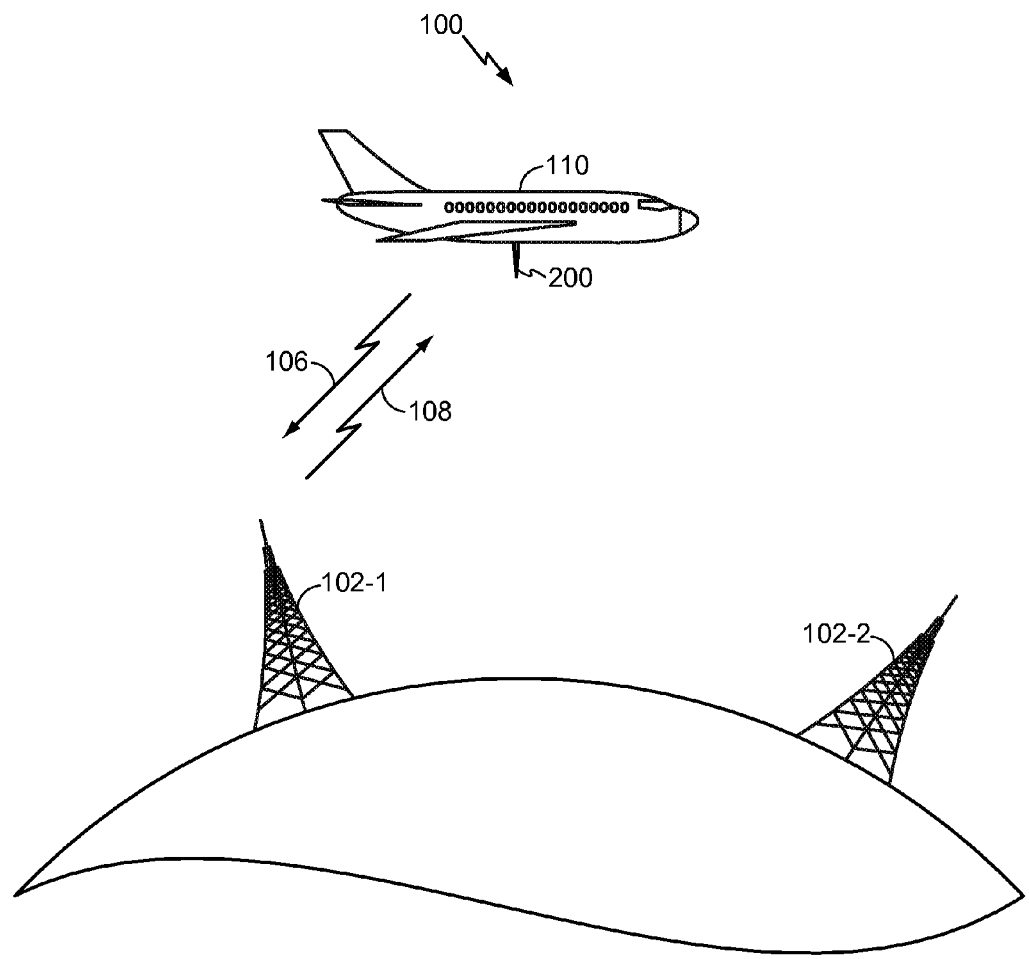
FIG. 1 is a block diagram conceptually illustrating an example of an air to ground communication system according to an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The spectrum available for Internet communication to aircraft by terrestrial Air to Ground (ATG) systems has been limited for practical and economic reasons. Providing seamless communication with aircraft flying at high altitudes over a large area (such as the continental U.S.) involves spectrum that is available over the large area. That is, the spectrum assigned to the ATG system should be available nationwide. It has been problematic, however, to identify a portion of spectrum that is available nationwide, much less arranging to free up such a portion of spectrum that is allocated for other uses.

A large amount of spectrum is assigned to geostationary satellites for use in broadcast TV and two way FSS (Fixed Satellite Service). Aspects of the present disclosure provide a high data rate aircraft to ground communication antenna system for sharing portions of the spectrum between ATG applications and geostationary satellite communication systems. Frequency bands such as C band (4 GHz downlink, 6 GHz uplink), Ku band (12 GHz downlink, 14 GHz uplink) and Ka band (20 GHz downlink, 30 GHz uplink) are currently used (or planned for) by geostationary satellite systems. In one aspect, a high data rate aircraft to ground communications antenna system may share the Ku uplink band to provide an aircraft with Internet service.

Aspects of the present disclosure provide methods and apparatus for an ATG system in which Ground Base Stations (GBSs) in communication with aircraft transceivers (ATs) in airplanes can use an uplink portion of spectrum assigned for satellite systems without intolerable interference with communications on the satellite systems, which is referred to herein as a next generation air to ground (Next-Gen AG) system. The systems and techniques described in the present disclosure may allow coexistence of the incumbent satellite system and the Next-Gen AG system on the same spectrum with negligible cross interference between the two systems. One aspect of the present disclosure describes techniques for mitigating interference caused by an AMSS (Aeronautical Mobile Satellite Service), and/or satellite earth station transmitters to aircraft receivers and ground base stations of the Next-Gen AG system. Satellite earth station transmitters may include, but are not limited to, earth station vehicles (ESVs), vehicular mounted earth stations (VMES), very small aperture terminal (VSAT) ground stations, and the like.

Figure 2:
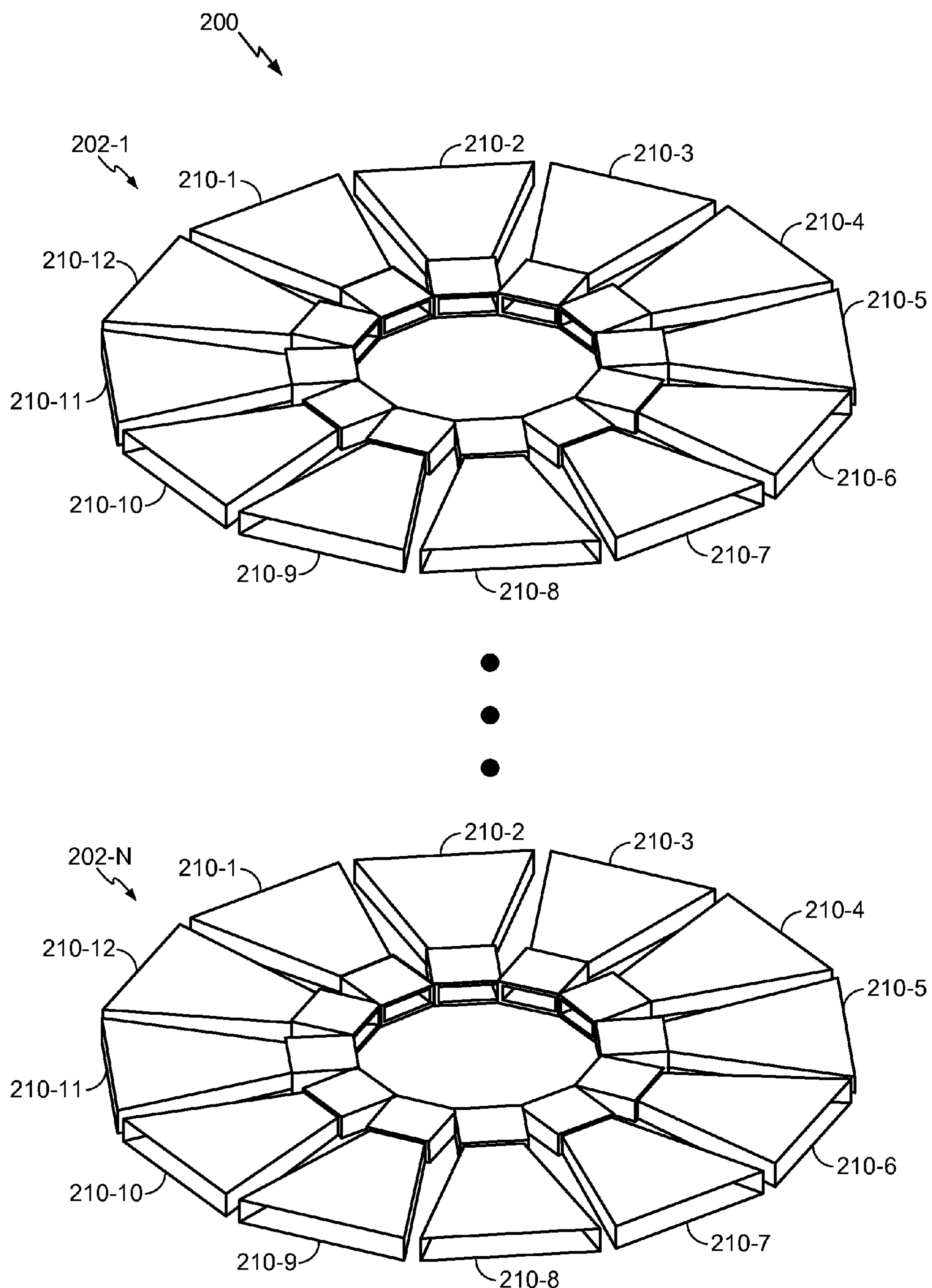
FIG. 2 is a diagram conceptually illustrating an example of an aircraft antenna system according to an aspect of the present disclosure.

A system 100 for wireless communication according to an illustrative aspect of the present disclosure is described in FIG. 1. In one aspect, the system 100 includes a ground base station 102-1 that transmits and receives signals on a satellite uplink band using a forward link (FL) 108-1 and a reverse link (RL) 106-1. An aircraft 110 includes an aircraft antenna 200 and aircraft transceiver (AT) 120 (FIG. 4) in communication with the ground base station 102-1. The aircraft transceiver (AT) 120 may also transmit and receive signals on the satellite uplink band using the forward link 108-1 and the return link 106-1. In one aspect, the aircraft antenna 200 may include a multi-beam switchable array antenna, as shown in FIG. 2. Another ground base station 102-2 is also shown.

In one configuration, the aircraft antenna 200 is comprised of a multi-beam switchable array that is able to communicate with the ground base station 102-1 at any azimuth angle. As shown in FIG. 1, the aircraft antenna 200 is mounted below the fuselage with a small protrusion and aerodynamic profile to reduce or minimize wind drag. In one configuration, the antenna elevation coverage is from approximately 3° to 20° below horizon to provide, for example, the pointing directions for the antenna gain. The aircraft antenna 200 may include an array N elements positioned such that each element directs a separate beam at different azimuth angles, each covering 360/N degrees, for example, as shown in FIG. 2.

FIG. 2 shows one example of an aircraft antenna array system 200 having multiple twelve-beam arrays 202 (202-1, . . . , 202-N) operating at, for example, 14 gigahertz (GHz). Representatively, the aircraft antenna array 202-1 has twelve horn antennas 210 (210-1, . . . ,210-12) each covering 30° sectors in azimuth with an aperture size of approximately 2.0 inches×0.45 inches, and having a gain of >10 dBi (dB isotropic). In one configuration, an overall diameter of the antenna array is roughly 8 inches.

Although FIG. 2 illustrates the aircraft antenna arrays 202 in a twelve-beam array configuration, it should be recognized that other configurations are possible while remaining within the scope of the present disclosure and appended claims. In particular, one example configuration includes four-antenna arrays 202 in a four-beam array configuration. The multiple aircraft antenna arrays 202 may enable ground base station search at different elevations. In one configuration, the multiple antenna arrays 202 enable sectorization of the ground base station antenna search in elevation. In this aspect, each element is coupled to its own transceiver. As described in further detail below, the ground base station search enables a handoff between the aircraft transceiver 120 (FIG. 4) and a next ground base station, such as a ground base station 102-2, as shown in FIG. 1.

In one configuration, the aircraft antenna array system 200 is mounted below the fuselage and an auxiliary antenna is mounted onto a separate portion of the aircraft to improve aircraft Internet service. In particular, banking or rolling of the aircraft during flight may interrupt communication between the aircraft antenna array system 200 mounted below the fuselage and the ground base station 102-1. In one configuration, the auxiliary antenna reduces disruption of the communication between the aircraft transceiver 120 and the ground base station 102-1 when the aircraft 110 banks or rolls by handling the communications with the ground base station 102-1 during these times. Characteristics of the aircraft antenna 200 are further illustrated in FIGS. 3A and 3B.

Figure 3A:
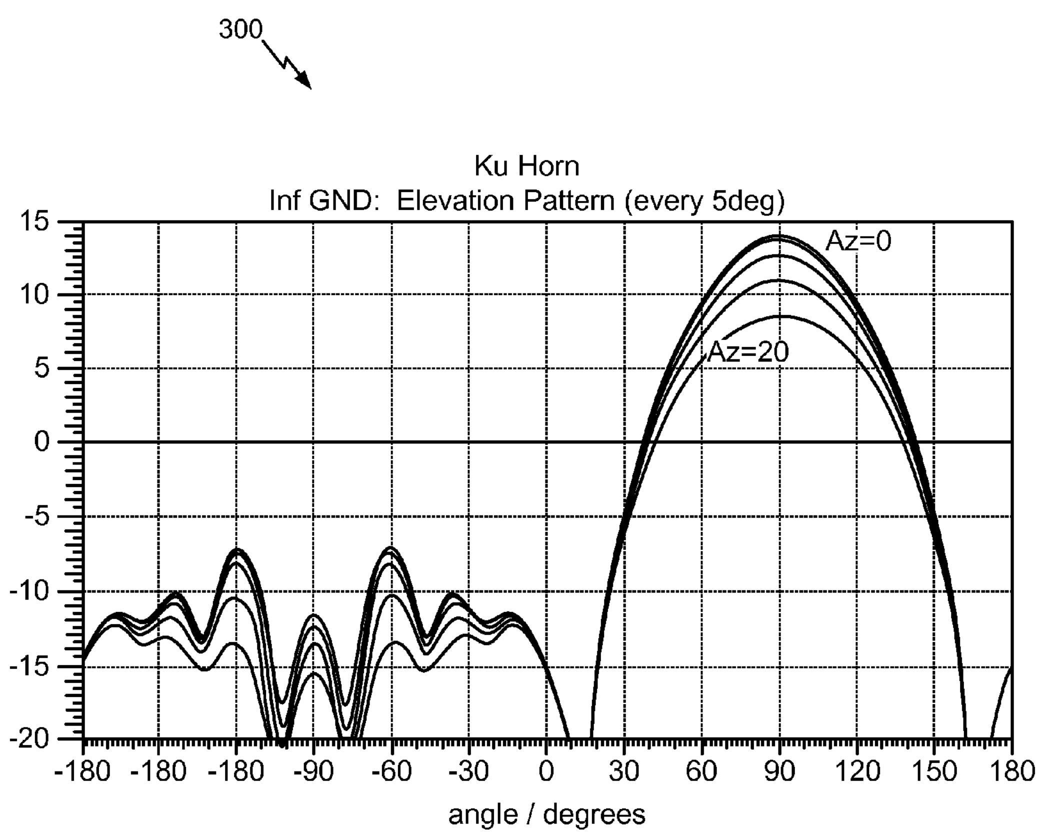
FIG. 3A is a diagram conceptually illustrating an example of a simulated gain pattern vs. an elevation angle of each antenna element of FIG. 2 over an infinite ground plane according to an aspect of the present disclosure.
Figure 3B:
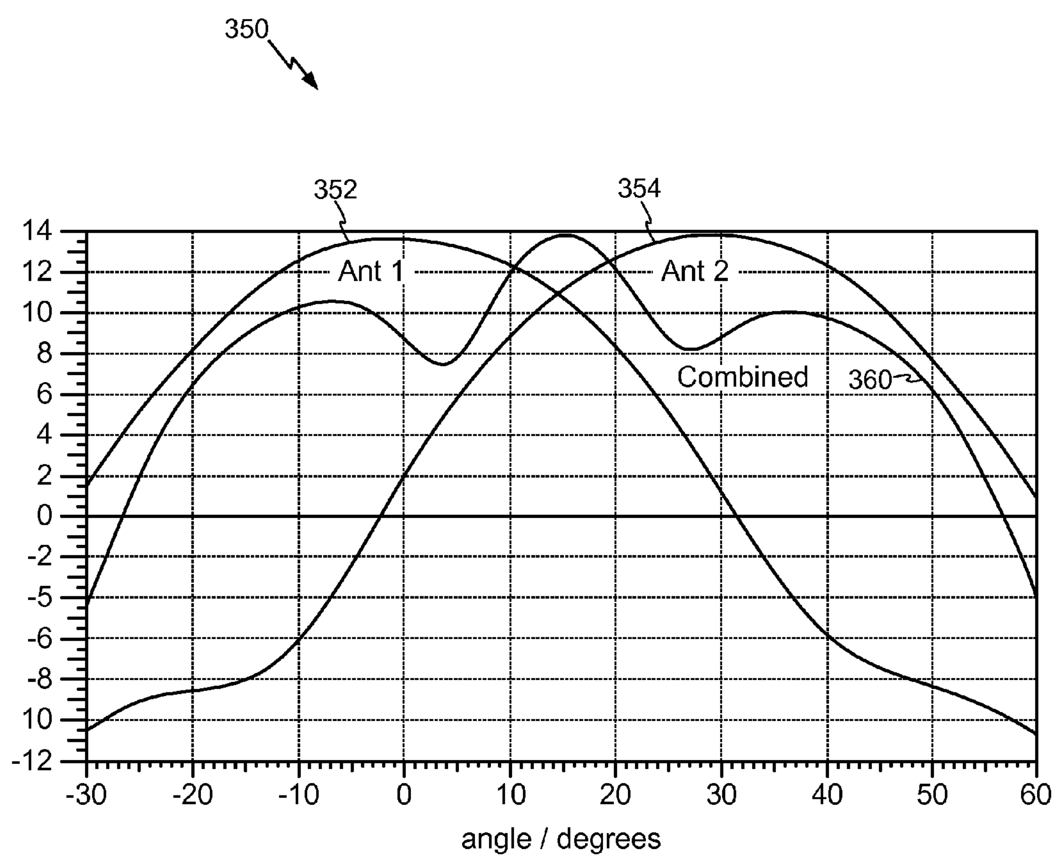
FIG. 3B is a diagram conceptually illustrating an example of a simulated gain pattern vs. an azimuth angle of adjacent antenna elements of FIG. 2 and a combined beam according to an aspect of the present disclosure.

FIG. 3A illustrates a diagram 300 of a simulated elevation gain pattern of a single antenna element 210 at azimuth angles of 0, 5, 10, 15 and 20 degrees, according to one aspect of the present disclosure. Representatively, the x-axis in FIG. 3A represents the theta angle in spherical coordinates where the horizon is at 90°. Because the simulation is performed over an infinite ground plane, the gain pattern above horizon (between −90 and 90) is duplicated due to image theory and should be ignored. FIG. 3B shows a diagram 350 of the simulated azimuth gain pattern of two adjacent elements and a digitally combined beam 360 according to one aspect of the present disclosure.

Operation of the aircraft antenna 200 for providing aircraft Internet service involves detection and aircraft modem handoff between a current ground base station 102-1 and a next ground base station 102-2, as shown in FIG. 1. Various schemes of communication and searching can be employed by the antenna system. In one configuration, a single receive chain is used for communication, with searching being performed in a sequential, time division manner. In another configuration, two receive chains may be used, with one chain for ground station communication and the other chain for ground base station search. In the two receive chain configuration, the searching chain can also be used for diversity combining to increase the gain and throughput while not searching. Ground base station search may be performed as follows.

Ground base station search may include a search of all pilot signals received from ground base stations on a given aircraft antenna element. The received pilot signals are ranked to determine whether or not the aircraft modem should handoff to another ground base station from which it is receiving a stronger pilot signal. Once the search on one antenna element is complete, the search may switch to another element and repeat the pilot search on that element. In one aspect, each of antenna elements 210-2 to 210-12 may continually search for ground stations while data is received by antenna element 210-1, as shown in FIG. 2.

In the configurations described above, a switched antenna scheme involves a transceiver that switches between different antenna elements to achieve high gain while maintaining low complexity. Alternatively, the directional beams may be formed by combining multiple antenna elements using phased array techniques. In one aspect, the switched antenna scheme described above may combine two adjacent beams 352 and 354 to form a digitally combined beam 360 for further increasing the antenna gain while only slightly increasing the hardware complexity to provide diversity. In one aspect, the switched antenna scheme may use a partial phased array beam combining of adjacent antenna elements. For example, adjacent beams may be combined to improve system performance when a communicating ground base station is at or near a boundary of the adjacent beams.

Figure 4:
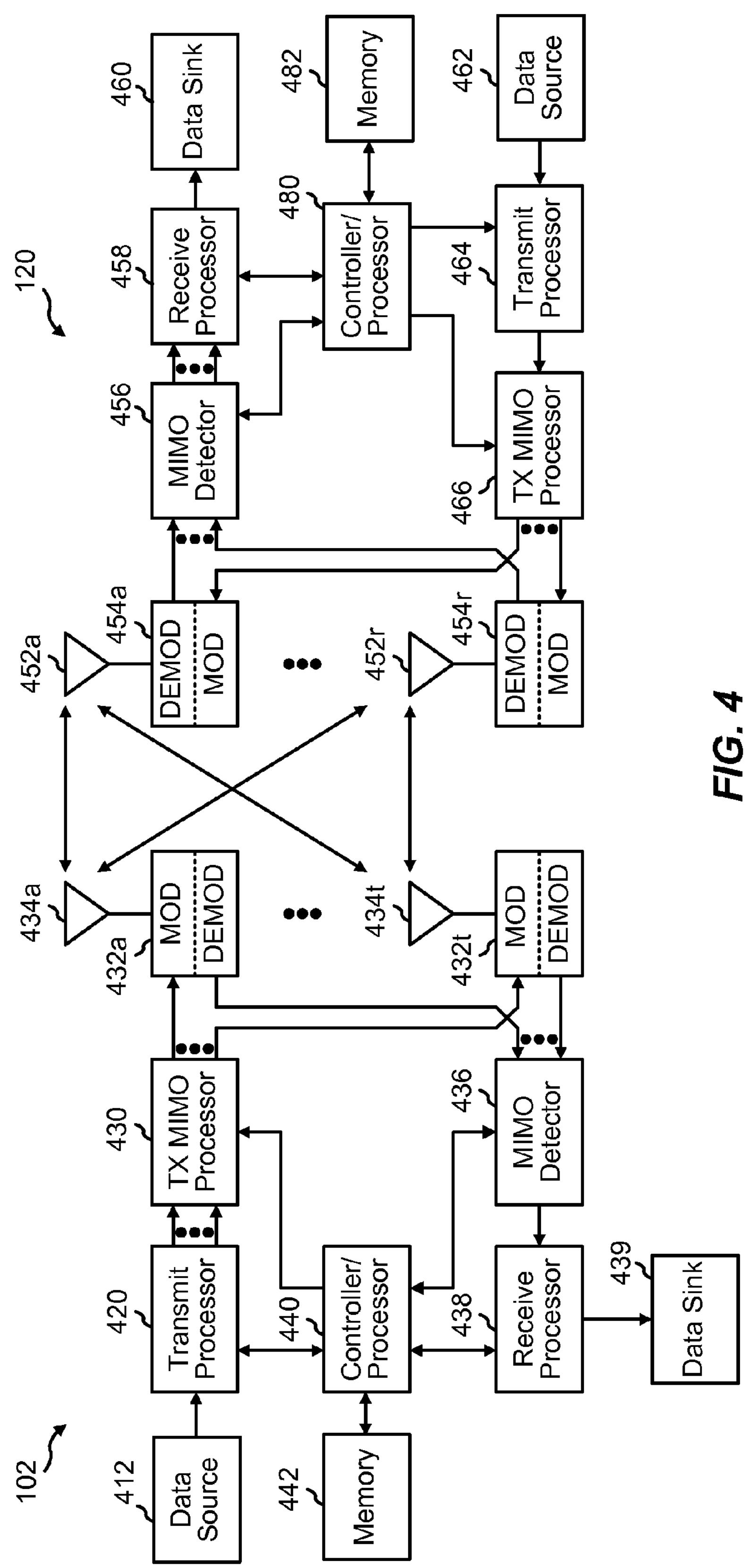
FIG. 4 is a diagram illustrating an example of a base station and an aircraft transceiver in a wireless network.

FIG. 4 shows a block diagram of a design of a ground base station 102 and an aircraft transceiver 120. The ground base station 102 may be equipped with antennas 434*a* through 434*t*, and the aircraft transceiver 120 may be equipped with antennas 452*a* through 452*r*.

At the ground base station 102, a transmit processor 420 may receive data from a data source 412 and control information from a controller/processor 440. The processor 420 may process (e.g., encode and symbol map) the data and control information to obtain data symbols and control symbols, respectively. The processor 420 may also generate reference symbols. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink/forward link signal. Downlink signals from modulators 432*a* through 432*t* may be transmitted via the antennas 434*a* through 434*t*, respectively.

At the aircraft transceiver 120, the antennas 452*a* through 452*r* may receive the downlink/forward link signals from the ground base station 102 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the aircraft transceiver 120 to a data sink 460, and provide decoded control information to a controller/processor 480.

On the reverse link/uplink, at the aircraft transceiver 120, a transmit processor 464 may receive and process data from a data source 462 and control information from the controller/processor 480. The processor 464 may also generate reference symbols for a reference signal. The symbols from the transmit processor 464 may be precoded by a TX MIMO processor 466 if applicable, further processed by the modulators 454*a* through 454*r*, and transmitted to the ground base station 102. At the ground base station 102, the uplink/reverse link signals from the aircraft transceiver 120 may be received by the antennas 434, processed by the demodulators 432, detected by a MIMO detector 436 if applicable, and further processed by a receive processor 438 to obtain decoded data and control information sent by the aircraft transceiver 120. The processor 438 may provide the decoded data to a data sink 439 and the decoded control information to the controller/processor 440.

The controllers/processors 440 and 480 may direct the operation at the ground base station 102 and the aircraft transceiver 120, respectively. The processor 440 and/or other processors and modules at the ground base station 102 may perform or direct the execution of various processes for the techniques described herein. The processor 480 and/or other processors and modules at the aircraft transceiver 120 may also perform or direct the execution of the functional blocks illustrated in use method flow chart of FIGS. 8, 10 and 11, and/or other processes for the techniques described herein. The memories 442 and 482 may store data and program codes for the ground base station 102 and the aircraft transceiver 120, respectively.

Figure 5:
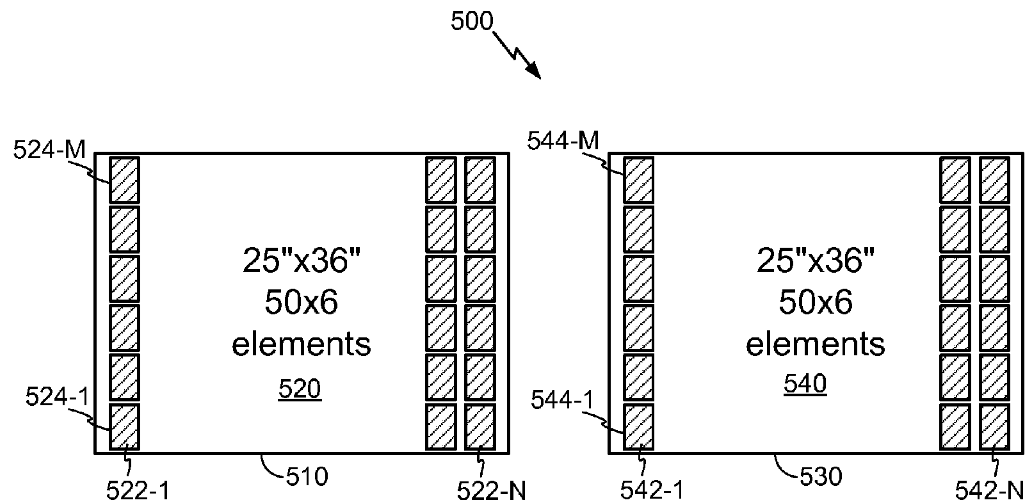
FIG. 5 is a block diagram conceptually illustrating a ground station antenna array system according to one aspect of the present disclosure.
Figure 6:
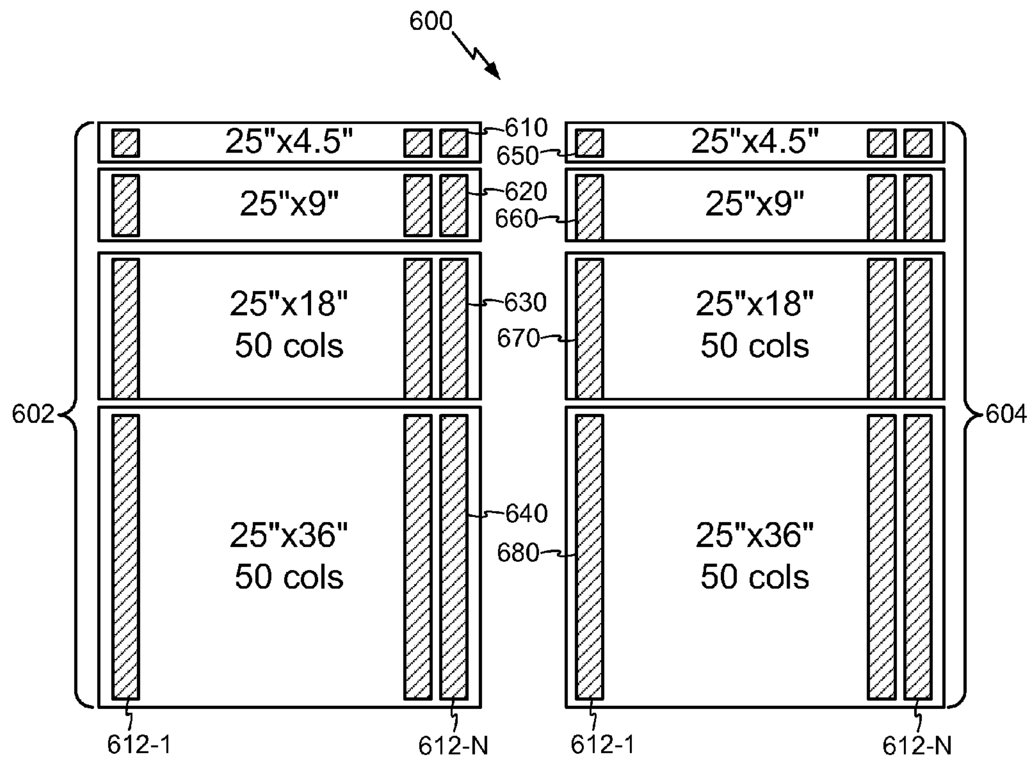
FIG. 6 is a block diagram conceptually illustrating a ground station antenna array system according to a further aspect of the present disclosure.

Ground station antenna array systems including antenna arrays for communicating with aircraft antenna 200 are shown in FIGS. 5 and 6 according to aspects of the present disclosure. In one aspect, a ground station antenna array system may include high gain multi-beam antenna arrays capable of communicating with multiple aircrafts simultaneously, for example, as shown in FIGS. 5 and 6. FIGS. 5 and 6 show two examples of the sectorization and antenna array configurations according to aspects of the present disclosure in which the sectorization and antenna array configurations are north pointing to reduce interference to satellites along the geographic (GEO) arc.

In one configuration, sectorization may include splitting sectors in elevation to increase system throughput, for example, as shown in FIGS. 5 and 6. Representatively, the coverage region in azimuth and elevation may be divided into narrow regions where the antenna array can maintain its gain requirement over all angles in the coverage area. In one configuration, the antennas may be operated in the 14 GHz range with a coverage region of 120° in azimuth and 0.5° to 20° in elevation. The ground base station antenna gain may be 40 dBi at 0.5° elevation and is reduced to 25.5 dBi at 10° elevation due to lower path loss to the aircraft.

Referring again to FIG. 5, FIG. 5 depicts a configuration of a ground base station antenna array system 500 with two antenna panels 510 and 530 each covering 60° in azimuth. In one aspect, each antenna panel 510/530 may consist of an N×M array 520/540 of antenna elements 522 (522-1, . . . , 522-N), 524 (524-1, . . . , 524-N), 542 (542-1, . . . , 542-N), and 544 (544-1, . . . , 544-N), respectively, which may be referred to herein as ground station antenna arrays. In one aspect, each antenna element includes a transmit/receive (T/R) module. Representatively, ground station antenna arrays 520 and 540 include 50×6 antenna elements; however, other configurations are possible while remaining within the scope of the described aspects and appended claims. In one aspect, digital beam forming may be employed to combine the signal and achieve the overall gain desired. The digital beam forming may be computed over the antenna elements in different columns and rows of each panel.

FIG. 6 depicts a configuration of a ground station antenna array system 600 in which a number of antenna panels 610, 620, 630 and 640, and 650, 660, 670 and 680, covering the elevation is increased to four and the number of panels 602 and 604 covering the azimuth is maintained at two. In one aspect, the aperture size for the panels (610/650) covering higher elevations is smaller than the aperture size for the panels (640/680) covering low elevations due to lower gain required at higher elevations. Each antenna array 612 (612-1, . . . , 612-N)/650 (650-1, . . . , 650-N) may include 50×1 elements where digital beam forming is applied. In one aspect, generation of the digital beam is switched, for example, between adjacent panels 610/650 to next adjacent panels 620/660 depending on an elevation of the aircraft.

Other configurations that utilize a smaller number of elements for digital beam forming can be achieved by further reducing the coverage region of each panel in azimuth and increasing the antenna aperture of the elements while maintaining the array size. This can lead to a larger overall ground station antenna array size but less complicated digital signal processing. In one aspect, a single element can be used for each sector without any digital beam forming, which corresponds to 100×4 antennas in the above example.

In one aspect, digital beam forming may be used in each array to provide multiple steerable pencil-beams. The signal for each element of the array may pass through a T/R (transmit/receive) module and is converted into baseband. In one aspect, the phase shifts for a directional beam are calculated by a beam steering computer and applied to each signal. Similar phase factors may be applied to the transmit signal and passed through the transmit/receive module into the antenna element. In one aspect, a calibration procedure equalizes the amplitude and phase of each element and accounts for the time variation of the circuitry.

As mentioned above, calibration compensates for the different phase/amplitude responses of the antenna and transmit/receive units. One type of calibration may be performed in the factory using built in circuitry. This calibration may use any well known technique. The built in calibration scheme may also be used for periodic calibration in the field to track changes due to temperature and aging. Another approach for calibration may be built into the air interface to provide real-time calibration while performing two-way communication between a ground base station and an aircraft modem. In one aspect, calibration is periodically performed using the communication signaling of an air interface. In particular, an over the air (OTA) real-time calibration may be performed while an air to ground two-way communication system operates.

In one configuration, the Forward Link (FL) on the Ground Base Station (GBS) unit periodically transmits a pilot signal on a wide beam that covers the whole sector. As described herein, the periodically transmitted pilot signal on the forward link of the ground base station may be referred to as a Sector Wide Pilot (SWP). In one aspect, the sector wide pilot may allow an aircraft to detect new ground base stations, to synchronize to the ground base stations, and to receive system parameters, such as information on a periodic calibration procedure described below. For example, as shown in FIG. 1, the ground base station 102 may transmit a sector wide pilot over forward link 108.

The wide beam may be used to transmit the sector wide pilot may be formed by transmitting on any of the individual ground station antenna array elements (522, 524, 542, 544, 612, or 650), for example, as shown in FIGS. 5 and 6. The aircraft modem may detect this sector wide pilot as part of its search procedure. One possible real time procedure to calibrate the transmit elements of the ground station antenna array elements is performed as follows.

The ground base station may periodically enter a calibration mode. The time of the calibration mode may be sent on the forward link on the same wide beam that carries the sector wide pilot. Calibrating the transmit side of the ground station antenna array may be initially performed. In particular, the ground base station transmitter may sequentially send the sector wide pilot on all ground station antenna array elements during a time period assigned to calibration. Following demodulation, the signal received at the aircraft from the k-th ground station antenna array element is given by:

$$(\alpha_K e^{-j\theta k})(\beta_k e^{-j\phi k})(\delta_K e^{-j\upsilon k})(\sigma_k e^{-j\partial k}) \quad (1)$$

In equation (1), the first term may correspond to gain ($_k$) and delay ($_k$) in the RF chain. The second term may correspond to the amplitude ($_k$) and phase ($_k$) of coupling between antenna elements. The third term may correspond to amplitude ($\delta_k$) the phase ($_k$) from antenna array spacing. The last term may correspond to multipath fading amplitude ($_k$) and phase ($\partial_k$). Also, j in equation (1) represents the imaginary part of a complex number.

In one configuration, the first three terms are due to the hardware and can be estimated by averaging out the last term by making a number of temporal measurements. For instance, given the high speed at which the aircraft travels, channel changes occur very rapidly (e.g., on the order of milliseconds). In one aspect, a number of measurements of equation (1) may be made over two millisecond intervals. These separate measurements may then be filtered to average out the last term in equation (1), which is due to multi-path. In equation (1), the last term may assume that either the channel is frequency non-selective or that the measurements are made over a narrow bandwidth such as on individual tones of an OFDM (orthogonal frequency division multiplexing) physical layer.

In a wide bandwidth system, the signals may be sent on a sufficient number of tones to ensure calibration of the hardware over all frequencies. The aircraft modem may compute the calibration coefficients as described above and transmits the coefficients to the ground base station so the ground base station may use these coefficients for forward link beam forming toward the aircraft, for example, as shown in FIG. 1.

Interference Mitigation Techniques for Air to Ground Systems

One aspect of the present disclosure describes techniques for mitigating interference caused by an AMSS (Aeronautical Mobile Satellite Service) and/or satellite earth station transmitters to aircraft receivers and ground base stations of a next generation air to ground (Next-Gen AG) system. Satellite earth station transmitters may include, but are not limited to, earth station vehicles (ESVs), vehicular mounted earth stations (VMES), very small aperture terminal (VSAT) ground stations, and the like. Another aspect of the present disclosure discusses techniques for mitigating interference from aircraft transmitters during aircraft rolls.

Figure 7:
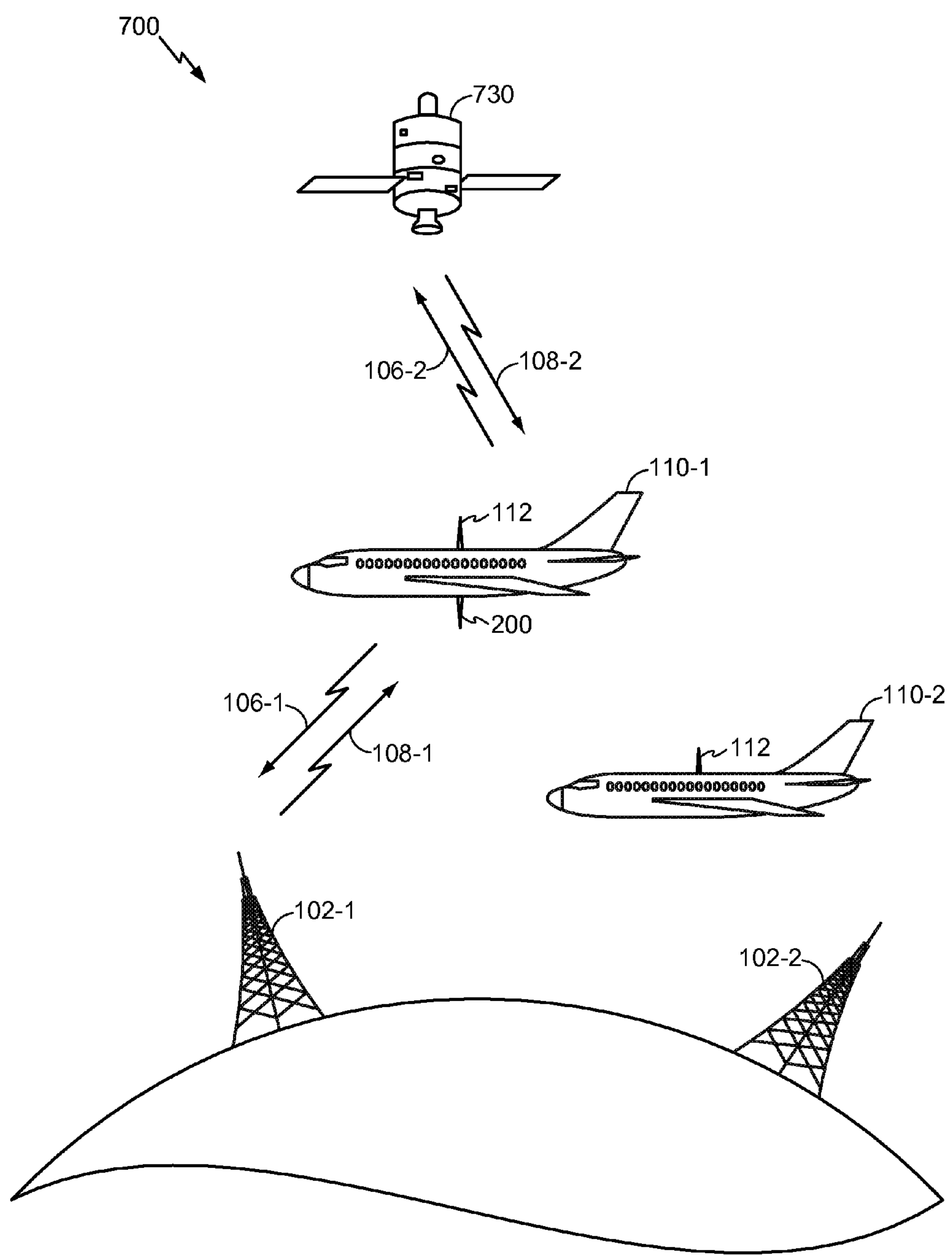
FIG. 7 is a block diagram conceptually illustrating an example of interference within an air to ground communication system according to one aspect of the present disclosure.

A system 700 for wireless communication according to an illustrative aspect of the present disclosure is described in FIG. 7. Representatively, the system 700 includes ground base stations 102 (102-1 and 102-1) that transmit and receive signals on a satellite uplink band using a forward link (FL) 108-1 and a return link (RL) 106-1. A first aircraft 110-1 includes a next generation air to ground (Next-Gen AG) system having an aircraft antenna 200 that is coupled to an aircraft transceiver (AT) 120, as shown in FIG. 4. The aircraft antenna 200 is in communication with the ground base station 102-1 and also transmits and receives signals on the satellite uplink band using the forward link 108-1 and the return link 106-1. In one configuration, the aircraft antenna 200 may include a multi-beam switchable array antenna, for example, as shown in FIG. 2. Another ground base station 102-2 is also shown.

In this configuration, the aircraft antenna 200 is comprised of a multi-beam switchable array that is able to communicate with the ground base stations 102 at any azimuth angle. The aircraft antenna 200 may be mounted below the fuselage with a small protrusion and aerodynamic profile to reduce or minimize wind drag. In one configuration, the antenna elevation coverage is from approximately 3° to 20° below horizon. The aircraft antenna 200 may include N elements positioned such that each element directs a separate beam at different azimuth angles, each covering 360/N degrees, for example, as shown in FIG. 2.

FIG. 7 further illustrates a second aircraft 110-2 that includes an aeronautical mobile satellite service (AMSS) system including an AMSS antenna 122. As shown in FIG. 7, the first aircraft 110-1 also includes an AMSS transmitter antenna 112. It is envisioned that if both a Next-Gen AG system and an AMSS system are installed on the same plane, one of the systems operates at a given time. For instance, the AMSS system may be installed for over the ocean coverage and the Next-Gen AG system may be installed for coverage over the continental United States (CONUS). In this configuration, the operation switches from one system to the other.

As shown in FIG. 7, however, an AMSS transmitter antenna 112 is mounted on the top of the fuselage of the second aircraft 110-2. The AMSS transmitter antenna 112 communicates with a satellite 730 via an uplink (or forward link) 106-2 and a downlink (or reverse link) 108-2. In this example, the AMSS-enabled (second) aircraft 110-2 is flying in close proximity to the Next-Gen AG-enabled (first) aircraft 110-1 that is operating a Next-Gen AG transceiver 120 (FIG. 4) with the aircraft antenna 200 mounted below the fuselage. As discussed in detail below, when the second aircraft 110-2 and the first aircraft 110-1 are in alignment (such as to cause excessive degradation to Next-Gen AG receiver), the spectrum used by the Next-Gen AG system may be impacted.

In one aspect of the present disclosure, the Next-Gen AG air interface's modulation symbol interleaving and forward error correction may be adjusted to mitigate the effect of lost symbols. Alternatively, the affected, first aircraft 110-1 may be readily assigned to a portion of the spectrum that the nearby, second aircraft 110-2 is not using.

As shown in FIG. 7, the Next-Gen AG antenna 200 is (e.g., by design) located on the bottom of the fuselage and pointing down toward negative elevation angles. In this configuration, the AMSS transmitter antenna 112 is mounted atop the fuselage of the second aircraft 110-2 and pointing at high elevations angles of at least 20° or greater and with a narrow beam-width. In one configuration, the average elevation angle of the AMSS transmitter of the AMSS transmitter antenna 112 over the continental US is approximately 40 degrees. Therefore, the second aircraft 110-2 interferes with the receiver of the first aircraft 110-1 when the two aircraft are flying nearby.

In particular, interference is caused to the receiver of the first aircraft 110-1 when the second aircraft 110-2 is flying roughly in parallel and to the north of the first aircraft 110-1, and the second aircraft 110-2 is flying at a lower altitude than the first aircraft 110-1 so that the bore sight of the AMSS transmitter antenna 112 points toward the back-lobe of first aircraft's antenna 200. When the two aircraft become aligned in altitude and proximity so that the transmitter of the AMSS transmitter antenna 112, the Next-Gen AG antenna 200 and the satellite that serves the AMSS transmitter antenna 112 line up, the effect of interference caused by AMSS transmitter may be mitigated as described above. The adjustment of the Next-Gen AG air interface's modulation symbol interleaving and forward error correction, however, may be insufficient to mitigate interference caused by the AMSS transmitter. In particular, the AMSS transmitter may cause excessive interference to the Next-Gen AG receiver when the two aircraft are within a predetermined distance of each other.

Another case where the AMSS transmitter may interfere with the Next-Gen AG receiver is the following. Interference to the Next-Gen AG receiver occurs when the second aircraft 110-2 is located between the first aircraft 110-1 and the ground station (GS) 102-1 that serves the first aircraft 110-1. When the second aircraft 110-2 is flying at a lower altitude than the first aircraft 110-1, the back-lobe of the AMSS transmitter may align with the peak antenna gain of the first aircraft's antenna 200. In an aspect of the present disclosure, it is possible to handoff the first aircraft 110-1 to another ground base station 102-2 so that the first aircraft's antenna 200 points away from the AMSS transmitter.

In other flight cases, the Next-Gen AG antenna 200 may roll off from its peak gain relative to the AMSS transmitter and well outside of the beam-width of the second aircraft 110-2. As a result, interference to the receiver of the first aircraft 110-1 from the second aircraft 110-2 may be mitigated by roll off such that the Next-Gen AG antenna is well outside the beam-width of the second aircraft 110-2.

In a further configuration, the Next-Gen AG system design is highly rate adaptive and can adjust its data rate to the C/(I+N) (signal (channel) plus interference to noise ratio) at the receiver. Therefore, in this configuration, interference from other sources may reduce the margin that was included in the system design, but does not result in any data rate reduction. Where interference increases temporarily to the point of lowering the C/(I+N) seen by the receiver below what is specified by the highest data rate, then the data rate is reduced temporarily until the interference source or the aircraft 110-2 has moved away.

Where the AMSS transmitter causes excessive interference to the portion of spectrum used by the AMSS transmitter, in one configuration, the first aircraft 110-1 is assigned to a different portion of the spectrum that is not used by the AMSS transmitter. Alternatively, the first aircraft 110-1 may be switched to another ground base station 102-2 that is not within the path of the AMSS transmitter. Note that depending on the bandwidth of the AMSS transmitter, at least a portion of the Next-Gen AG receiver bandwidth is impacted which may not be mitigated by using modulation symbol interleaving and forward error correction, thereby resulting in a reduction of the data rate. In another configuration, modulation symbol interleaving and forward error correction may mitigate the bandwidth impact without having to assign the Next-Gen AG transceiver 120 to a different portion of the spectrum.

Figure 8:
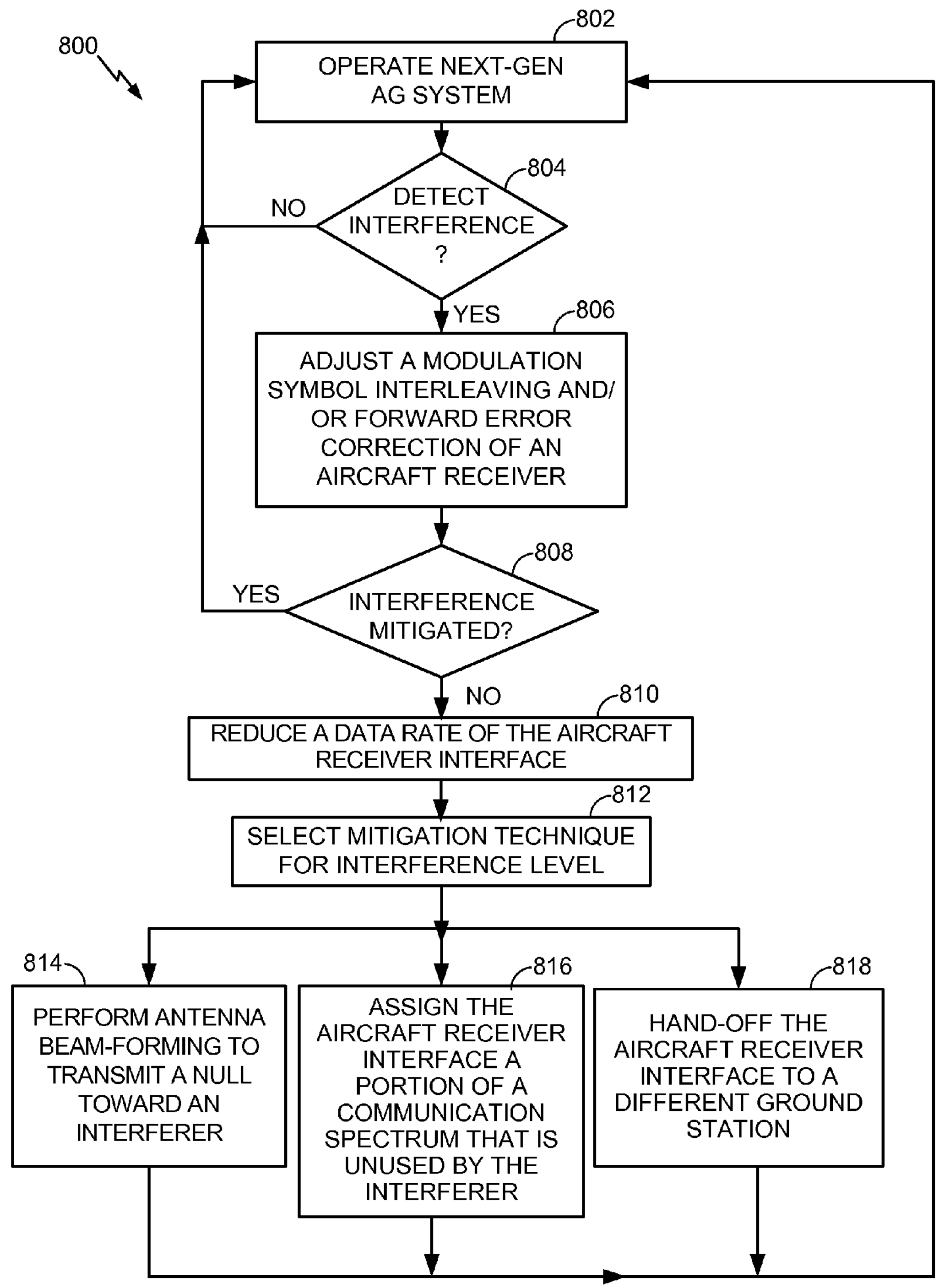
FIG. 8 is a flow diagram showing a process for interference mitigation within the air to ground two-way communication system of FIG. 7 according to an aspect of the present disclosure.

A process for interference mitigation within an air to ground two-way communication system (e.g., the Next-Gen AG system 700 of FIG. 7) may be performed as follows. FIG. 8 is a flow chart illustrating a method 800 for interference mitigation within a Next-Gen AG system according to one aspect of the present disclosure. At block 802, the Next-Gen AG system operates to provide Internet service for an aircraft, for example, as shown in FIG. 7. At block 804, it is determined whether interference is detected during operation of the Next-Gen AG system.

For example, as shown in FIG. 7 a second aircraft 110-2, including an AMSS transmitter antenna 112 mounted on the top of the fuselage, is flying in close proximity to a first aircraft 110-1 that is operating a Next-Gen AG transceiver 120 (FIG. 4) with the antenna 200 mounted below the fuselage. When the second aircraft 110-2 and the first aircraft 110-1 are in alignment, excessive degradation may be incurred by the Next-Gen AG receiver of the first aircraft 110-1. If interference is detected, at block 806, the Next-Gen AG air interface's modulation symbol interleaving and forward error correction may be adjusted to mitigate the effect of the interference from the second aircraft 110-2. At block 808, it is determined whether the interference is mitigated by the adjustment of the modulation symbol interleaving and forward error correction. When the interference is not mitigated, at block 810 a further interference mitigation technique is selected, for example, according to a detected interference level from the second aircraft 110-2.

One further interference mitigation technique is data rate adjustment. As indicated, the design of the Next-Gen AG system 700 is highly rate adaptive and can adjust its data rate to the signal quality (e.g., C/(I+N) (signal plus interference to noise ratio)) at the receiver. Where interference increases temporarily to the point of lowering the signal quality seen by the receiver below what is specified by the highest data rate, then the data rate is reduced temporarily until the interference source or the aircraft 110-2 has moved away, as shown in block 812.

If the AMSS transmitter causes excessive interference to the receiver of the first aircraft 110-1 when the second aircraft 110-2 is flying roughly in parallel and to the north of the first aircraft 110-1 and the second aircraft 110-2 is flying at a lower altitude than the first aircraft 110-1, the bore sight of the AMSS transmitter antenna 112 points toward the back-lobe of first aircraft's antenna 200. As result of this interference, another interference mitigation technique can be attempted at block 814. In this scenario, the first aircraft 110-1 is assigned to a different portion of the spectrum that is not used by the AMSS transmitter.

The second aircraft 110-2 can be located between the first aircraft 110-1 and the ground base station 102-1 that serves the first aircraft 110-1 when the second aircraft 110-2 is flying at a lower altitude than the first aircraft 110-1 so that the back-lobe of the AMSS transmitter is aligned with the peak antenna gain of the first aircraft's antenna 200. To mitigate the interference, at block 818 a handoff of the first aircraft 110-1 to another ground base station 102-2 is performed so that the Next-Gen AG antenna 200 points away from the AMSS transmitter. After blocks 812, 814, 816, 804:NO and 808:YES, the process returns to block 802.

Figure 9:
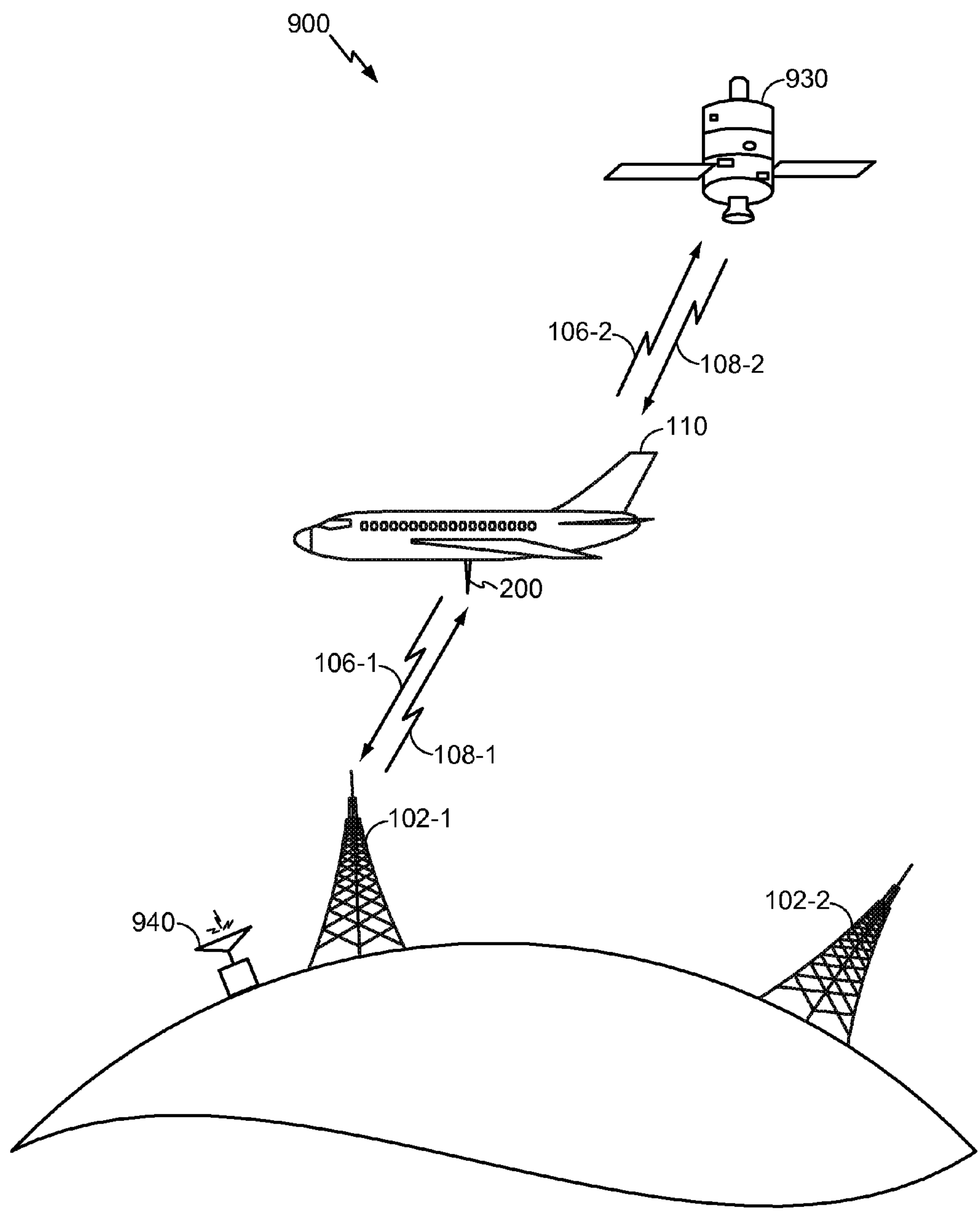
FIG. 9 is a block diagram conceptually illustrating another example of interference within an air to ground communication system according to one aspect of the present disclosure.

A system 900 for wireless communication according to a further illustrative aspect of the present disclosure is described in FIG. 9. Representatively, the system 900 includes ground base stations 102 (102-1 and 102-1) that transmit and receive signals on a satellite uplink band using a forward link (FL) 108-1 and a return link (RL) 106-1. An aircraft 110 includes a next generation air to ground (Next-Gen AG) system having an aircraft antenna 200 that is coupled to an aircraft transceiver (AT) 120, as shown in FIG. 4. The aircraft antenna 200 is in communication with the ground base station 102-1 and also transmits and receives signals on the satellite uplink band using the forward link 108-1 and return link 106-1. In one configuration, the aircraft antenna 200 may include a multi-beam switchable array antenna, for example, as shown in FIG. 2. Another ground base station 102-2 is also shown.

FIG. 9 further illustrates a satellite earth station transmitter 940 that transmits and receives signals on a satellite uplink band using a forward link (FL) 108-2 and a return link (RL) 106-2 for communicating with a serving satellite 930. As shown in FIG. 9, the satellite earth station transmitter 940 is in close proximity to a ground base station 102-1 of the Next-Gen AG system 900. In this scenario, when the ground base station 102-1 is between the satellite earth station transmitter 940 and its serving satellite 930, then the satellite earth station transmitter 940 may cause excessive interference to the ground base station 102-2 on the portion of the spectrum being used by the satellite earth station transmitter 940.

The actual distance at which harmful interference occurs depends on the propagation environment and factors such as clutter. In scenarios where the ground base station 102-1 is in an open environment as shown in FIG. 9, the satellite earth station transmitter 940 may cause excessive interference to the ground base station 102-1 on a portion of the spectrum. In these cases, there are a number of mitigation techniques designed into the next generation system to mitigate the interference, for example, as shown in FIG. 10.

Figure 10:
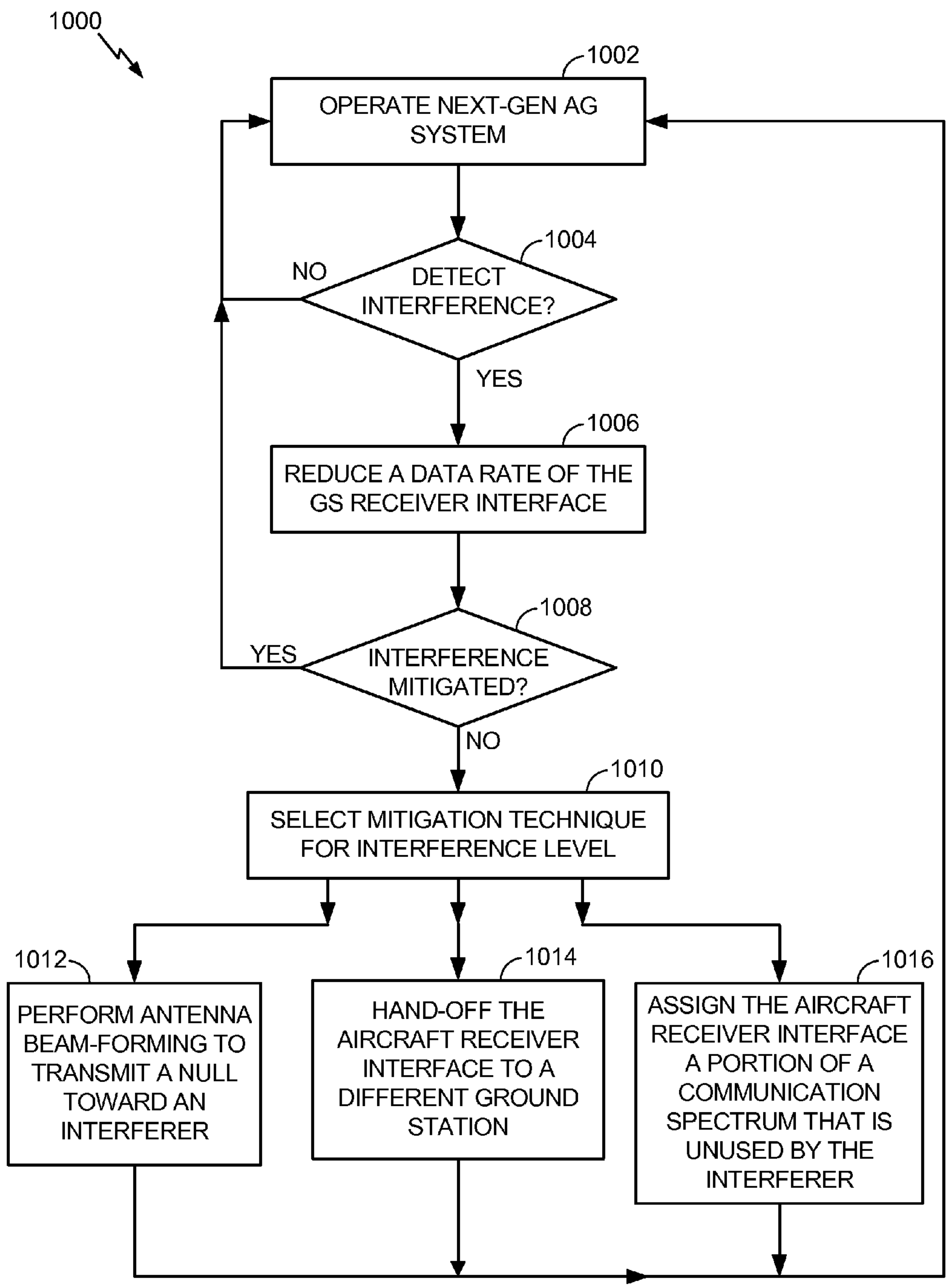
FIG. 10 is a flow diagram showing a process for interference mitigation within the air to ground communication system of FIG. 9 according to an aspect of the present disclosure.

FIG. 10 is a flow chart illustrating a method 1000 for mitigating interference to a serving ground base station from a satellite earth station transmitter according to one aspect of the present disclosure. At block 1002, the Next-Gen AG system operates to provide Internet service for an aircraft, for example, as shown in FIG. 9. At block 1004 it is determined whether interference is detected during operation of the Next-Gen AG system. When interference is detected from a satellite earth station transmitter, at block 1006 a data rate of a receiver of the ground base station 102-1 is adjusted to mitigate the effect of the interference from, for example, the satellite earth station transmitter 940, as shown in FIG. 9.

At block 1008, it is determined whether the interference is mitigated by adjusting the data rate of the ground base station receiver. When the interference is not mitigated, at block 1010 a further interference mitigation technique is selected, for example, according to a detected interference level from the satellite earth station transmitter 940.

One further interference technique is antenna beam-forming toward the interferer (e.g., satellite earth station transmitter 940). In particular, the ground base station 102-1 may create nulls toward the nearby vehicle using active beam-steering or other similar antenna techniques at block 1012. In one configuration, the antenna system of the ground base station 102-1 creates narrow beams that are steered to avoid interference to Non-Geostationary Satellite Orbit (GSO) and Non-Geostationary Satellite Orbit (NGSO) satellite systems, while providing high capacity. In this configuration, the null toward the satellite earth station transmitter 940 may be formed because the vehicle is almost at the horizon or even below the horizon relative to the antenna of the ground base station 102-1, whereas the aircraft 110 is served by a ground base station beam that is formed above the horizon.

Referring again to FIG. 9, while the null is created toward the satellite earth station transmitter 940, the main antenna gain toward the aircraft 110 on the return link 106-1 is reduced, resulting in a reduction in the data rate on the return link 106-1 from the aircraft 110 to the ground base station 102-1. Therefore, the effect of this interference source is a lower data rate on the return link 106-1 for the aircraft 110, which should last for a limited period of time due to movement of the aircraft 110.

Referring again to FIG. 10, a handoff may be performed to mitigate the interference from the satellite earth station transmitter 940. At block 1014, a handoff is performed to handoff the aircraft 110 to a different ground base station 102-2, which is referred to as cell site diversity. In this aspect of the disclosure, each aircraft equipped with a Next-Gen AG system can connect to at least two ground base stations.

Yet another mitigation technique is to assign the particular aircraft 110 to a different portion of the spectrum that is not being used by the satellite earth station transmitter 940, as shown at block 1016. In one aspect of the disclosure, frequency reassignment is a feature of the system scheduler of the Next-Gen AG system. In this configuration, the frequency reassignment should mitigate the interference source with little impact to the data rate of the aircraft 110. After blocks 1012, 1014, 1016, 1008:YES and 1004:NO, the process returns to block 1002.

Referring again to FIG. 9, when the satellite earth station transmitter 940 is within sufficient proximity to the ground base station 102-1 and aligned with the ground base station 102-1 and its serving satellite 930, then either the portion of spectrum used by the satellite earth station transmitter 940 is not used by the ground base station 102-1 and/or the ground base station 102-1 operates at a lower rate. As a result, the average throughput of the return link 106-1 of the site is slightly reduced. In this aspect of the disclosure, the reduced throughput of the return link 106-1 is shared with adjacent cell sites because of the handoff, resulting in a reduced net effect on the average return link 106-1 throughput.

Figure 11:
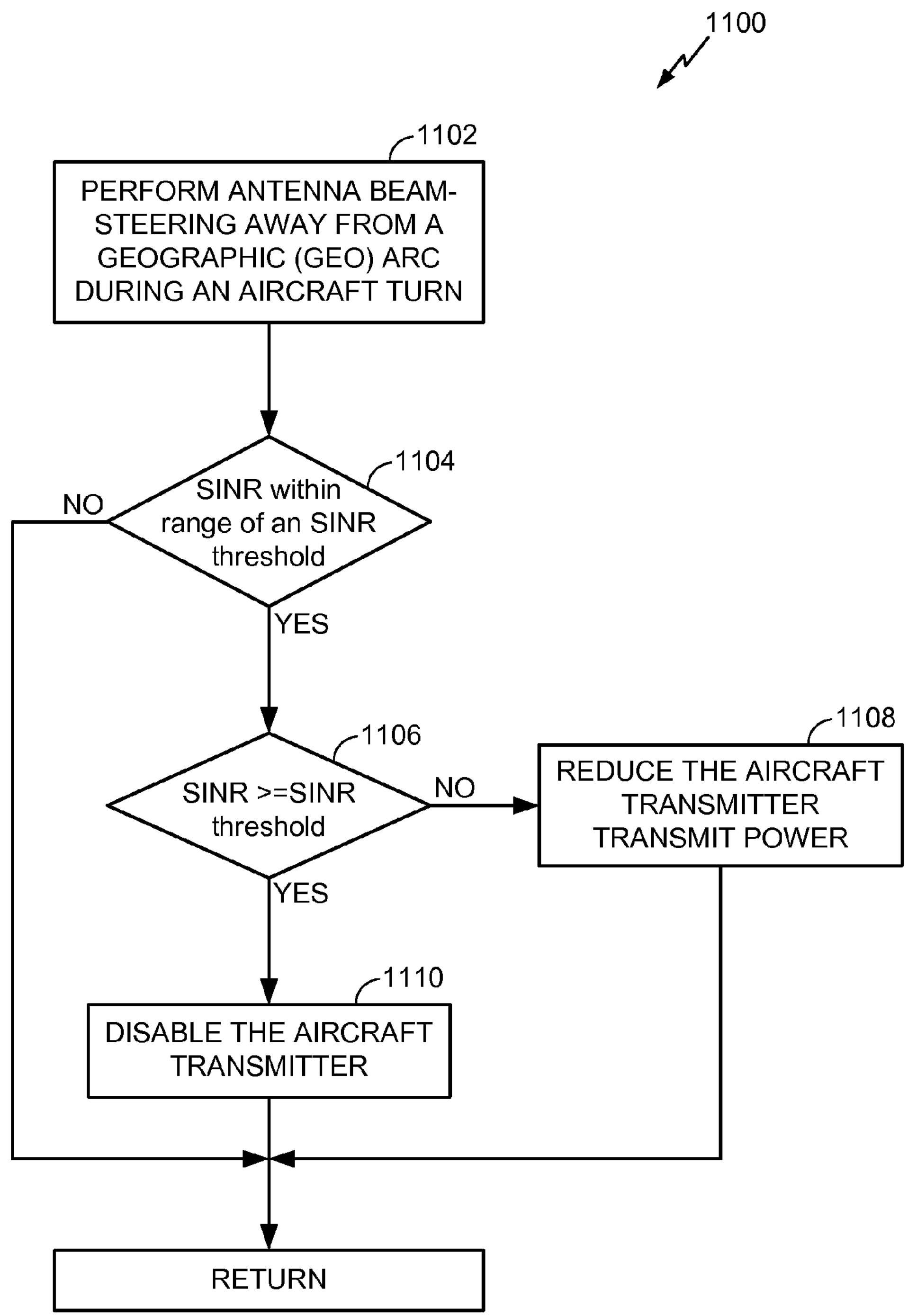
FIG. 11 is a flow chart illustrating a process for mitigating aircraft interference according to one aspect of the present disclosure.

FIG. 11 is a flow chart illustrating another method 1100 for mitigating interference to Next-Gen AG enabled aircraft during aircraft turns according to one aspect of the present disclosure. During operation, the roll angle for commercial planes and private jets is around 15 degrees during turns. The amount of time an aircraft spends during turns is a fraction of the average flight time. In this aspect of the disclosure, increased interference into the geo-arc during aircraft turns is reduced by performing aircraft antenna beam-steering down and away from the geo-arc, as shown in block 1102.

At block 1104, it is determined whether a signal to interference plus noise ratio (SINR) is within a predetermined range of a signal quality (e.g., SINR) threshold. When the signal quality is within the predetermined range of the signal quality threshold, at block 1106 it is determined whether the signal quality is greater than or equal to the signal quality threshold. When the signal quality is within the predetermined range of but greater than the signal quality threshold, at block 1108, a transmit power of the aircraft transmitter is reduced. Otherwise, at block 1110, the aircraft transmitter is disabled.

In one aspect of the disclosure, an aircraft roll angle is estimated with a device such as a 3-axis accelerometer/gyroscope combination device, designed for avionics with a smaller degree of sensitivity. Based on the estimated aircraft roll, power (e.g., an effective isotropically radiated power (EIRP)) of the aircraft may be controlled during the flight to ensure that a rise over thermal (RoT) limit into the geo-arc is not exceeded. In one configuration, the aircraft transmitter is turned off when the aircraft transceiver does not receive a forward link signal strong enough for demodulation (i.e., signal quality exceeds threshold). In this configuration, during large turns in which the antenna beam is not steered toward the ground base station, the forward link is lost and the transmitter is turned off without receiving information from the accelerometer/gyroscope device. The aircraft transceiver may measure the received SINR on the forward link and if the SINR drops below a certain threshold, then the transmitter is turned off, assuming the aircraft antenna beam is not being steered toward the ground base station.

In one configuration, an aircraft is configured for wireless communication including means for adjusting a modulation symbol interleaving and/or forward error correction of an aircraft receiver interface in response to detected interference from an interferer. In one aspect, the adjusting means may the antenna 452*a-r*, the modulator 454*a-r*, the transmit processor 464, the controller/processor 480, and/or memory 482 of FIG. 4. The aircraft is also configured to include a means for reducing a data rate of the aircraft receiver interface when the adjusting of the modulation symbol interleaving and/or forward error correction does not mitigate the detected interference from the interferer. In one aspect, the data rate reducing means may be the controller/processor 480, and/or memory 482 of FIG. 4. In another aspect, the aforementioned means may be any module or any apparatus configured to perform the functions recited by the aforementioned means.

The aircraft is also configured to include a means for performing antenna beam-steering away from a geographic (GEO) arc during an aircraft turn. In one aspect, the beam-steering means may be an aircraft transceiver 120 of the aircraft antenna array 200, as shown FIGS. 1, 2, and 4, the controller/processor 440, the memory 442, transmit processor 420, the modulators 432*a-t*, and/or the antenna 434*a-t* of FIG. 4. The aircraft is also configured to include a means for reducing an aircraft transmitter transmit power when a signal quality, e.g., signal to interference plus noise ratio (SINR), of a forward link is within a predetermined range of a signal quality threshold. In one aspect, the transmit power reducing means may be the antenna 452*a-r*, the modulator 454*a-r*, the transmit processor 464, controller/processor 480, and/or the memory 482 of FIG. 4. In another aspect, the aforementioned means may be a module or any apparatus configured to perform the functions recited by the aforementioned means.

In one configuration, a ground base station equipped with a multi-beam array antenna is configured for wireless communication including means for operating the ground base station in the presence of an interferer. In one aspect, the operating means may be the controller/processor 440, and/or memory 442 of FIG. 4. In this configuration, the ground base station also includes means for assigning an aircraft receiver interface a portion of a communication spectrum that is unused by an interferer when interference is detected from a satellite earth station transmitter (e.g., a vehicle mounted earth station (VMES) an earth station vehicle (ESV), and/or a very small aperture terminal (VSAT) ground station). In one aspect, the assigning means may be the controller/processor 440, and/or memory 442 of FIG. 4.

In another aspect of the disclosure, the ground base station is also configured to include a means for handing-off an aircraft receiver interface to a different ground station when interference is detected from a satellite earth station transmitter according to one aspect of the present disclosure. In one aspect, the handing-off means is the controller/processor 440, the memory 442, the transmit processor 420, the modulators 432*a-t*, and/or antenna 434*a-t* of FIG. 4. The ground base station is also configured to include a means for performing antenna beam-forming to transmit a NULL toward an interferer when interference is detected from a satellite earth station transmitter. In one aspect, the beam-forming means is the controller/processor 440, the memory 442, the transmit processor 420, the modulators 432*a-t*, and/or the antenna 434*a-t* of FIG. 4. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for air to ground communication interference mitigation within an aircraft equipped with a multi-beam array antenna, comprising:

adjusting a modulation symbol interleaving and/or forward error correction of an aircraft receiver interface in response to detected interference from a forward link of an interferer aircraft;

reducing a data rate of the aircraft receiver interface when the adjusting of the modulation symbol interleaving and/or forward error correction does not mitigate the detected interference, from the forward link of the interferer aircraft, on communications received by the aircraft receiver interface from a serving ground station through the multi-beam array antenna; and providing aircraft internet service based on the communications received by the aircraft receiver interface from the serving ground station through the multi-beam array antenna.

2. The method of claim 1, in which the interferer aircraft includes an aeronautical mobile satellite service (AMSS) transmitter.

3. The method of claim 1, further comprising:

assigning the aircraft receiver interface a portion of a communication spectrum that is unused by the interferer aircraft when reducing the data rate of the aircraft receiver interface does not mitigate the detected interference from the forward link of the interferer aircraft.

4. The method of claim 1, further comprising:

handing-off the aircraft receiver interface to a different ground station when reducing the data rate of the aircraft receiver interface does not mitigate the detected interference from the forward link of the interferer aircraft.

5. A method for air to ground communication interference mitigation within an aircraft equipped with a multi-beam array antenna, comprising:

adjusting a modulation symbol interleaving and/or forward error correction of an aircraft receiver interface in response to detected interference from an interferer;

reducing a data rate of the aircraft receiver interface when the adjusting of the modulation symbol interleaving and/or forward error correction does not mitigate the detected interference, from the interferer;

performing antenna beam-steering away from a geographic (GEO) arc during an aircraft turn; and disabling an aircraft transmitter when a roll-angle of the aircraft turn is greater than or equal to a predetermined roll-angle threshold.

6. An apparatus configured for air to ground communication interference mitigation within an aircraft equipped with a multi-beam array antenna, the apparatus comprising:

a memory; and at least one processor coupled to the memory, the at least one processor being configured:

to adjust a modulation symbol interleaving and/or forward error correction of an aircraft receiver interface in response to detected interference from a forward link of an interferer aircraft;

to reduce a data rate of the aircraft receiver interface when the adjusting of the modulation symbol interleaving and/or forward error correction does not mitigate the detected interference, from the forward link interferer aircraft, on communications received by the aircraft receiver interface from a serving ground station through the multi-beam array antenna; and to provide aircraft internet service based on the communications received by the aircraft receiver interface from the serving ground station through the multi-beam array antenna.

7. The apparatus of claim 6, in which the interferer aircraft includes an aeronautical mobile satellite service (AMSS) transmitter.

8. The apparatus of claim 6, in which the at least one processor is further configured to assign the aircraft receiver interface a portion of a communication spectrum that is unused by the interferer when reducing the data rate of the aircraft receiver interface does not mitigate the detected interference from the forward link of the interferer aircraft.

9. The apparatus of claim 6, in which the at least one processor is further configured to hand-off the aircraft receiver interface to a different ground station when reducing the data rate of the aircraft receiver interface does not mitigate the detected interference from the forward link of the interferer aircraft.

10. An apparatus configured for air to ground communication interference mitigation within an aircraft equipped with a multi-beam array antenna, the apparatus comprising:

a memory; and at least one processor coupled to the memory, the at least one processor being configured:

to adjust a modulation symbol interleaving and/or forward error correction of an aircraft receiver interface in response to detected interference from an interferer;

to reduce a data rate of the aircraft receiver interface when the adjusting of the modulation symbol interleaving and/or forward error correction does not mitigate the detected interference, from the interferer;

to perform antenna beam-steering away from a geographic (GEO) arc during an aircraft turn; and to disable an aircraft transmitter when a roll-angle of the aircraft turn is greater than or equal to a predetermined roll-angle threshold.

11. A computer program product configured for air to ground communication interference mitigation within an aircraft equipped with a multi-beam array antenna, the computer program product comprising:

a non-transitory computer-readable medium having non-transitory program code recorded thereon, the program code comprising:

program code to adjust a modulation symbol interleaving and/or forward error correction of an aircraft receiver interface in response to detected interference from a forward link of an interferer aircraft;

program code to reduce a data rate of the aircraft receiver interface when the adjusting of the modulation symbol interleaving and/or forward error correction does not mitigate the detected interference, from the forward link of interferer aircraft, on communications received by the aircraft receiver interface from a serving ground station through the multi-beam array antenna; and program code to provide aircraft internet service based on the communications received by the aircraft receiver interface from the serving ground station through the multi-beam array antenna.

12. An apparatus operable for air to ground communication interference mitigation within an aircraft equipped with a multi-beam array antenna, the apparatus comprising:

means for adjusting a modulation symbol interleaving and/or forward error correction of an aircraft receiver interface in response to detected interference from a forward link of an interferer aircraft;

means for reducing a data rate of the aircraft receiver interface when the adjusting of the modulation symbol interleaving and/or forward error correction does not mitigate the detected interference, from the forward link of the interferer aircraft, on communications received by the aircraft receiver interface from a serving ground station through the multi-beam array antenna; and means for providing aircraft internet service based on the communications received by the aircraft receiver interface from the serving ground station through the multi-beam array antenna.

* * * * *